United States Patent [19]
Shimizu et al.

[11] Patent Number: 4,749,759
[45] Date of Patent: Jun. 7, 1988

[54] PROCESS FOR THE PREPARATION OF POLYMERS OF INORGANIC ACID SALTS OF MONOALLYLAMINE OR N-SUBSTITUTED MONOALLYLAMINES

[75] Inventors: Kiyoshi Shimizu, Koriyama; Susumu Harada, Tokyo, both of Japan

[73] Assignee: Nitto Boseki Co., Ltd., Fukushima, Japan

[21] Appl. No.: 824,630

[22] Filed: Jan. 31, 1986

[30] Foreign Application Priority Data

Feb. 4, 1985 [JP] Japan .................................. 60-19558

[51] Int. Cl.$^4$ ............................ C08F 4/04; C08F 12/28
[52] U.S. Cl. .................................. 526/218.1; 526/310
[58] Field of Search .................. 526/218, 310, 218.1

[56] References Cited
U.S. PATENT DOCUMENTS 2,599,300  6/1952  Upson .................................. 526/62
4,504,640  3/1985  Harada et al. .................... 526/218.1
4,528,347  7/1985  Harada et al. .................... 526/218.1

OTHER PUBLICATIONS

Chem. Abstracts, vol. 78, entry 54672n, 1983, Wako, Ltd.
Chem. Abstracts, vol. 81, entry 136781k, Wako, Ltd., 1974.

Primary Examiner—Joseph L. Schofer
Assistant Examiner—Peter F. Kulkosky
Attorney, Agent, or Firm—Bert J. Lewen; Henry Sternberg

[57] ABSTRACT

High molecular weight polymers are produced in a high yield by polymerizing inorganic acid salts of monoallylamine or N-substituted monoallylamines in a polar solvent in the presence of a specific azo type radical initiator.

3 Claims, No Drawings

PROCESS FOR THE PREPARATION OF POLYMERS OF INORGANIC ACID SALTS OF MONOALLYLAMINE OR N-SUBSTITUTED MONOALLYLAMINES

BACKGROUND OF THE INVENTION

1. Technical Field

This invention relates to a process for the preparation of polymers of inorganic acid salts of monoallylamine or N-substituted monoallylamines.

2. Prior Art

As is well known, allyl compounds are hard to polymerize with an ordinary radical initiator, and usually there can merely be produced polymers thereof with a low degree of polymerization in a low yield. The reason is accounted for by the fact that there takes place a selftermination reaction due to a reaction between the allylic hydrogen atoms and the radical. This reaction is usually referred to as allylic degradative chain transfer.

This fact is a common knowledge to the polymer chemists and mentioned in many literatures and books (for example, C. E. Schildknecht: Allyl Compounds and their Polymers, Wiley-Interscience, 1973, pp. 29–30, and R. C. Laible: Chem. Rev., 58, pp. 807–843 (1958)).

The same holds true with monoallylamine which is a kind of allyl compounds, and no literature is yet available which reports the successful obtainment of corresponding polymers of monoallylamine in a high yield by use of an ordinary radical initiator or ionic initiator.

Quite recently, one of the present inventors (Harada) found that polymers can be obtained easily and in a high yield by polymerizing inorganic acid salts of monoallylamine in a polar solvent by using an azo-type radical initiator containing a group having cationic nitrogen atoms in the molecule, and a patent application has been filed on this finding under Japanese Patent Application No. 54988/83 (Laid-Open No. 201811/83).

The present inventors have extensively carried out polymerization of inorganic acid salts of monoallylamine in a polar solvent by using azo-type polymerization initiators of various structures and found that the polymerization performance of these initiators is greatly affected by the structure thereof, and their relation was reported (33rd Annual Meeting of Japan Polymer Society, A Collection of Preliminary Papers No. 2, page 84 (1984)).

SUMMARY OF THE INVENTION

Based on these findings, the present inventors have made further researches in radical initiators for the polymerization of monoallylamine and N-substituted monoallylamine monomers and found that the use of a compound represented by the following general formula (I) as radical initiator can provide a polymer with an extremely high molecular weight, and this novel finding was materialized as the present invention.

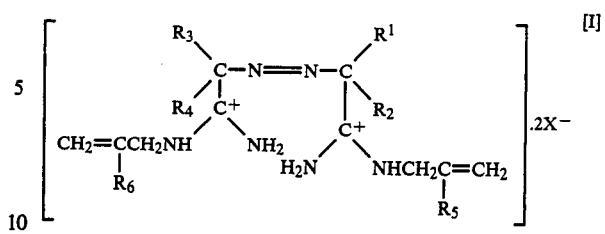

In the above formula (I), $R_1$, $R_2$, $R_3$ and $R_4$ represent a same or different hydrocarbon groups such as alkyl group having 1-4 carbon atoms, cycloalkyl group having 3-6 carbon atoms, phenyl group and benzyl group, and $R_1$ and $R_2$, and/or $R_3$ and $R_4$ may form a ring; $R_5$ and $R_6$ represent independently hydrogen or an alkyl group having 1-4 carbon atoms, such as methyl group; and X represents an anion such as chlorine anion, bromine anion, iodine anion, $NO_3^-$ or $\frac{1}{2} SO_4^{--}$.

Thus, the present invention is a process for preparing high polymers of monoallylamine or N-substituted monoallylamines characterized by polymerizing inorganic acid salts of monoallylamine or N-substituted monoallylamines in a polar solvent in the presence of a radical initiator represented by the above-shown general formula (I).

Ordinary radical initiators, when increased in amount added, accelerate the polymerization and the produced polymer is correspondingly reduced in molecular weight. This is a common knowledge in the polymer chemistry (see, for example, T. Tsuruta: Polymer Synthetic Reactions, PP. 25–27, in Compendium of Industrial Chemistry II, published by Nikkan Kogyo Shimbunsha, 1979). Therefore, for obtaining a polymer with a high molecular weight by a radical reaction, it is necessary to reduce the amount of radical initiator as much as possible.

Said phenomenon is also noted ordinarily in the polymerization of allylamines. For instance, when an inorganic acid salt of an allylamine is polymerized by adding radical initiator (II) or (III) disclosed in the invention of the above-mentioned Japanese Patent Application No. 54988/83 (Laid-Open No. 201811/83) (the chemical structure of said both initiators being shown in Table 2 of Example 1 given later in this specification) and the polymerization degree ($\eta_{inh}$) of the produced polymer is examined, it is noted that the polymerization degree lowers as the amount of initiator added is increased (see the Examples given later). This fact seems to suggest that the similar tendency would be occasioned when the initiator (I) of this invention is applied to the polymerization of inorganic acid salts of allylamines, but the reverse is the case: the molecular weight of the produced polymer increases proportionally to the increase of the amount of initiator (I) added, and quite unexpectedly, there can be obtained polymers with an extremely high molecular weight (see the Examples given later, especially Table 1 in Example 1).

This is quite a surprising fact, and the present inventors achieved the present invention based on this fact.

PREFERRED EMBODIMENTS OF THE INVENTION

Typical examples of the monoallylamine and N-substituted monoallylamines usable in this invention include the following: monoallylamine, N-methylallylamine, N-ethylallylamine, N-n-propylallylamine, N-isopropylallylamine, N-n-butylallylamine, N-sec-butylallylamine, N-tert-butylallylamine, N-iso-butylallylamine, N-cyclohexylallylamine, and N-benzylallylamine.

Preferred examples of inorganic acid salts of these monoallylamine and N-substituted monoallylamines, are hydrochlorides, sulfates, sulfites, and phosphates.

Polymerization is conducted in a polar solvent, for example, water, an inorganic acid (hydrochloric acid, sulfuric acid, phosphoric acid, polyphosphoric acid, etc.) or an aqueous solution thereof, an organic acid or an aqueous solution thereof, formamide, an aqueous solution of a salt of an inorganic acid (zinc chloride, calcium chloride, magnesium chloride, etc.).

In the polymerization, inorganic acid salts of said monoallylamine or N-substituted monoallylamines are usually used in the form of isolated crystal, but free bases thereof and inorganic acids may be added in said polar solvent to form a salt in situ (in that system). Needless to say, in case of using an inorganic acid or an aqueous solution thereof as polymerization medium, a predetermined amount of monoallylamine or N-substituted monoallylamines may be added in the inorganic acid or aqueous solution thereof and polymerized as is.

Typical examples of azo-type initators usable in this invention are listed below. It will be, however, evident that these are merely illustrative and may be replaced by others for producing the similar effect.

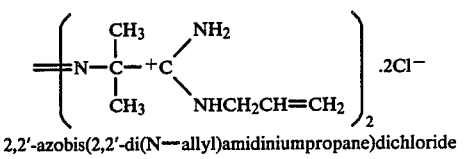

(1) 2,2'-azobis(2,2'-di(N—allyl)amidiniumpropane)dichloride

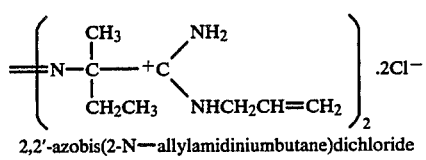

(2) 2,2'-azobis(2-N—allylamidiniumbutane)dichloride

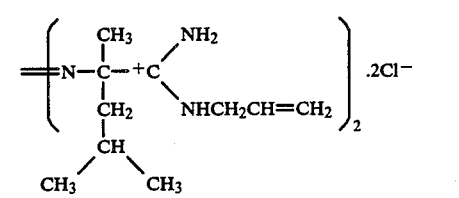

(3) 2,2'-azobis(2-N—allylamidinium(4-methyl)pentane)dichloride

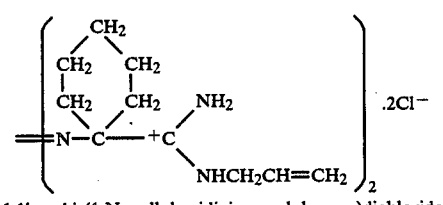

(4) 1,1'-azobis(1-N—allylamidiniumcyclohexane)dichloride

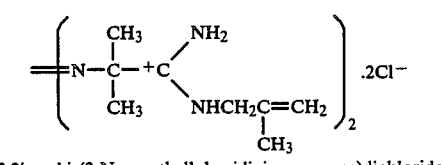

(5) 2,2'-azobis(2-N—methallylamidiniumpropane)dichloride

Unlike other ordinary initiators, the initiators used in this invention, when used in an excess amount, make the product polymer insoluble in the solvent. Therefore, except for certain specific cases where the polymerization is conducted under a positively insolubilizing condition for some specific uses of the produced polymer, generally the initiator is used in an amount of 0.05–10% by weight, usually 1–7% by weight, based on the weight of the inorganic acid salt of monoallylamine or N-substituted monoallylamines used.

Polymerization temperature differs depending on the chemical structure of the initiator used, but it is usually in the range of 30°–100° C., preferably 40°–70° C. Polymerization time is usually less than 150 hours.

The higher the concentration of starting monomer within the limits of its solubility, the more desirable, but usually it is in the range of 10–85% by weight.

Polymerization is preferably carried out in an inert gas such as nitrogen since, in this invention, polymerization is impeded, though not greatly, by oxygen in the air.

In this way, in accordance with this invention, high-polymerization-degree polymers of inorganic acid salts of monoallylamine and N-substituted allylamines can be easily produced.

In order to further clarify the present invention, it is described more particularly below by way of the embodiments thereof.

REFERENTIAL EXAMPLE 1

Synthesis of radical initiator

The radical initiators (1)–(5), of which chemical structures are previously illustrated, were synthesized by acting monoallylamine or monomethallylamine to an inorganic acid salt of a non-substituted amidinoazo compound having a corresponding chemical structure (this compound is synthesized according to the method disclosed in U.S. Pat. Nos. 2,599,299 and 2,599,300, or a method analogous thereto).

Synthesis of initiator (1)

5 g of 2,2'-azobis(2-amidinopropane) dihydrochloride is dispersed in 50 ml of monoallylamine and stirred at room temperature. The system becomes a transparent yellow solution in 30–50 minutes after start of the reaction, but the reaction is further continued. After the reaction, excess monoallylamine is distilled off and the residue is recrystallized from a water-acetone mixed solution. Yield: 6.38 g, 98.8%. Elemental analysis of the product: C, 47.11%; H, 8.15%; N, 23.43%. (Calcd. for $C_{14}H_{28}N_6Cl_2$: C, 47.86%; H, 8.03%; N, 23.92%). The IR absorption spectrum of this substance shows absorption due to allyl group at 930 $cm^{-1}$ and 990 $cm^{-1}$, beside absorption of amidino group. Further, this substance was ascertained to be initiator (1) by the analyses of UV absorption spectrum and NMR absorption spectrum.

In the similar way, initiators (2)–(4) were obtained from inorganic acid salts of corresponding non-substituted amidinoazo compounds and monoallylamine.

Radical initiator (5) can be obtained in the same way as the synthesis method of initiator (1) except for use of monomethallylamine in place of monoallylamine.

EXAMPLE 1

571 g (10 moles) of monoallylamine was added dropwise into 1.1 kg (35% by weight) of concentrated hydrochloric acid under stirring and ice-cooling at 5°–10° C. After this dropwise addition, water and excess hydrogen chloride were distilled off at 60° C. under reduced pressure of 200 mmHg by using a rotary evaporator to obtain white crystals. These crystals were dried over silica gel at 80° C. under reduced pressure of 5 mmHg to obtain 980 g of MAA-HCl. This MAA-HCl contained about 5% of water.

Water was added to said MAA-HCl of 5% water content to prepare 50%, 55% and 65% aqueous solutions of MAA-HCl. 10 g of each of these aqueous solutions was pipetted into a test tube with ground stopper, and then initiator (1) was added and dissolved in an amount of 0.01–0.06% by mole based on the monomer, and the mixture was subjected W to static polymerization at 50° C. for 70 hours. After the reaction, the system was poured into 200 ml of methanol and the sediment was filtered off, followed by repeated washing with methanol and drying at 50° C. under reduced pressure for 12 hours. The yield of the resultantly obtained polymers and intrinsic viscosity ($\eta_{inh}$) measured at 30° C. in 5% 1/10 M NaCl aq. solution are shown collectively in Table 1.

By way of comparison, the results obtained by similarly conducting the polymerization by adding initiators (II) and (III) disclosed in aforementioned Japanese Patent Application No. 54988/83 (Laid-Open No. 201811/83) are shown in Table 2.

From the results of elemental analysis, IR spectral analysis and $^1$H-NMR analysis of the obtained polymers, it was confirmed that each of these polymers was a poly(allylamine hydrochloride) (PAA-HCl).

TABLE 1

Polymerization of MAA—HCl solution with initiator (1)

| Run No. | Conc. of MAA—HCl solution (%) | Amount of initiator (1) added (mol % based on MAA—HCl) | Yield (%) | $\eta_{inh}$ |
|---|---|---|---|---|
| 1 | 60 | 0.045 | 78.0 | 0.57 |
| 2 | 60 | 0.223 | 80.2 | 0.64 |
| 3 | 60 | 0.333 | 83.6 | 0.78 |
| 4 | 60 | 0.443 | 85.9 | 1.01 |
| 5 | 60 | 0.463 | 90.2 | 1.14 |
| 6 | 60 | 0.480 | 92.3 | 1.41 |
| 7 | 60 | 0.500 | 98.6 | 1.62 |
| 8 | 55 | 0.340 | 78.3 | 0.70 |
| 9 | 55 | 0.485 | 80.2 | 1.00 |
| 10 | 55 | 0.605 | 81.6 | 1.53 |
| 11 | 50 | 0.533 | 75.4 | 0.70 |
| 12 | 50 | 0.600 | 80.3 | 1.30 |

TABLE 2

Polymerization of MAA-HCl solution with initiators (II) and (III)

| Run No. (Comp. experiments) | Conc. of MAA-HCl solution (%) | Amount of initiator (II) added (mol % based on MAA-HCl) | Amount of initiator (III) added (mol % based on MAA-HCl) | Yield (%) | $\eta_{inh}$ |
|---|---|---|---|---|---|
| 1 | 62 | 0.401 | — | 83.4 | 0.38 |
| 2 | 62 | 0.590 | — | 89.4 | 0.35 |
| 3 | 62 | 0.779 | — | 93.8 | 0.32 |
| 4 | 62 | 0.985 | — | 94.5 | 0.30 |
| 5 | 53 | 0.395 | — | 76.8 | 0.36 |
| 6 | 53 | 0.589 | — | 85.1 | 0.31 |
| 7 | 52 | 0.783 | — | 89.7 | 0.28 |
| 8 | 53 | 0.983 | — | 91.9 | 0.26 |
| 9 | 62 | — | 0.400 | 85.1 | 0.27 |
| 10 | 62 | — | 0.590 | 91.0 | 0.25 |
| 11 | 62 | — | 0.779 | 95.2 | 0.20 |
| 12 | 62 | — | 0.985 | 96.3 | 0.18 |

Initiator (II)

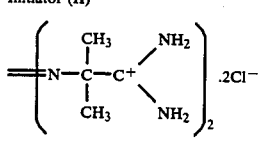

Initiator (III)

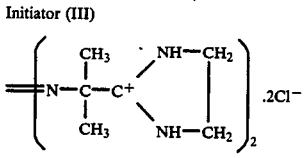

EXAMPLE 2

A 60% aqueous solution was prepared from MAA-HCl synthesized in Example 1. Thereafter 100 g of this 60% MAA-HCl solution was put into a 200 ml-capacity Erlenmeyer flask with stopper, followed by the addition and dissolution therein of measured amounts of initiator (1), and after replacement of the atmosphere with nitrogen, the mixture was polymerized at 50° C. for 72 hours. The experimental results are shown in Table 3 in which the results of the experiments (comparative examples) using initiator (II) in place of initiator (1) are also shown by way of comparison.

TABLE 3

Polymerization of MAA—HCl solution with initiator (I) or initiator (II)

| Run No. | Conc. of MAA—HCl solution (%) | Type and amount of initiator added (mol % based on MAA—HCl) | | Yield (%) | $\eta_{inh}$ |
|---|---|---|---|---|---|
| 13 | 60 | Initiator (1) | 0.766 | 90.96 | 2.20 |
| 14 | 60 | Initiator (1) | 0.959 | 89.69 | 3.21 |
| (Comp. experiments) | | | | | |
| 13 | 60 | Initiator (II) | 0.766 | 92.0 | 0.33 |
| 14 | 60 | Initiator (II) | 0.959 | 93.5 | 0.31 |

EXAMPLE 3

922.3 g (8 moles) of 85% phosphoric acid was put into a 2 liter-capacity round flask provided with a stirrer, a thermometer, a reflux condenser and a dropping funnel, and then 228.4 g (4 moles) of monoallylamine (MAA) was added dropwise thereto under stirring. The reaction system was maintained at 10°–30° C. during this operation. After said dropwise addition, the system was stirred and reacted for 4 hours. The obtained solution contained 19.85 g of MAA in 100 g of the solution.

50 g of the thus prepared MAA-phosphoric acid solution was put into a 100 ml-capacity Erlenmeyer flask with stopper, followed by the addition and dissolution therein of determined amounts of initiator (1), and after nitrogen replacement of the atmosphere, the mixture was polymerized at 65° C. for 24 hours. After the reaction, the system was poured into a large quantity of water, and the viscous substance insoluble in water was washed well with water and then added and dissolved with 30 ml of concentrated hydrochloric acid to make the polymer into a hydrochloride. The latter was poured into 300 ml of methanol. The produced sediment was filtered off and the residue was subjected to methanol extraction with a Soxhlet's extractor for 8 hours and vacuum dried at 50° C. for 8 hours. Each of the thus obtained polymers was found to be a poly(allylamine hydrochloride) from the determination by IR absorption spectrum and NMR absorption spectrum. The experimental results are shown in Table 4 along with those obtained by using initiator (II) in place of initiator (1) for the purpose of comparison.

TABLE 4

Polymerization of MAA-phosphoric acid solution with initiator (1) or (II)

| Run No. | Feed of MAA-phosphoric acid solution (g) | Type and amount of initiator added (mol % based on MAA) | | Yield (%) (as poly-(allylamine hydrochloride)) | $\eta_{inh}$ |
|---|---|---|---|---|---|
| 15 | 50 | Initiator (1) | 0.045 | 63.5 | 0.75 |
| 16 | 50 | Initiator (1) | 0.089 | 68.4 | 0.84 |
| 17 | 50 | Initiator (1) | 0.100 | 70.6 | 1.08 |
| 18 | 50 | Initiator (1) | 0.200 | 69.8 | 1.15 |
| 19 | 50 | Initiator (1) | 0.445 | 75.6 | 1.26 |
| 20 | 50 | Initiator (1) | 0.500 | 80.2 | 2.15 |
| (Comp. experiments) | | | | | |
| 15 | 50 | Initiator (II) | 0.10 | 78.5 | 0.65 |
| 16 | 50 | Initiator (II) | 0.50 | 83.6 | 0.60 |

EXAMPLE 4

A 70% aqueous solution was prepared from MAA-HCl synthesized in Example 1. Thereafter 20 g of this 70% MAA-HCl solution was pipetted into 30 ml ground stoppered test tubes, and after adding and dissolving therein initiators (1)–(5) in determined amounts respectively, subjected to static polymerization at 60° C. for 48 hours. The treatments after the polymerization were the same as in Example 1. The results are shown in Table 5.

TABLE 5

Polymerization of MAA—HCl solution with initiators (1)–(5)

| Run No. | Conc. of MAA—HCl solution (%) | Type of initiator used | Amount of initiator used (mol % based on MAA—HCl) | Yield (%) | $\eta_{inh}$ |
|---|---|---|---|---|---|
| 21 | 70 | (1) | 0.35 | 90.8 | 0.82 |
| 22 | 70 | (1) | 0.45 | 93.6 | 1.89 |
| 23 | 70 | (2) | 0.35 | 89.6 | 0.76 |
| 24 | 70 | (2) | 0.45 | 90.4 | 1.80 |
| 25 | 70 | (3) | 0.35 | 90.0 | 0.83 |
| 26 | 70 | (3) | 0.45 | 91.3 | 1.56 |
| 27 | 70 | (4) | 0.35 | 78.9 | 0.90 |
| 28 | 70 | (4) | 0.45 | 81.6 | 1.68 |
| 29 | 70 | (5) | 0.35 | 75.3 | 0.79 |
| 30 | 70 | (5) | 0.45 | 79.6 | 1.38 |

EXAMPLE 5

52.1 g of 35% hydrochloric acid was added to 49.6 g (0.5 mole) of N-isopropylallylamine under cooling to obtain a 66.7% aqueous solution of N-isopropylamine hydrochloride. This solution was added with 0.790 g (0.45 mol % based on the monomer) of initiator (1) and polymerized in a nitrogen atmosphere at 60° C. for 48 hours. The reaction product was added into a large quantity of acetone, the produced sediment was filtered off, and the residue was vacuum dried at 50° C. to obtain 53.6 g of white powder (rate of polymerization: 79.1%). The IR absorption spectrum of this product showed disappearance of absorption (at 930 cm$^{-1}$ and 990 cm$^{-1}$) due to allylic double bond. Intrinsic viscosity ($\eta_{inh}$) of this polymer was 0.68.

By way of comparison, polymerization was carried out under the same conditions as said above except that 1.36 g (1.00 mol % based on the monomer) of initiator (II) was added in place of initiator (1). In this case, intrinsic viscosity ($\eta_{inh}$) of the obtained polymer was as low as 0.22.

EXAMPLE 6

52.1 g of 35% hydrochloric acid and 13.4 g of water were added to 69.6 g (0.5 mole) of N-cyclohexylallylamine under cooling to obtain a 65.0% aqueous solution of N-cyclohexylallylamine hydrochloride. This solution was added with 1.054 g (0.600 mol % based on the monomer) of initiator (1) and polymerized at 60° C. for 48 hours. The resulting reaction product was treated in the same way as in Example 1 to obtain 61.8 g of white powder (rate of polymerization: 70.3%). In the IR absorption spectrum of this product, absorption at 930 cm$^{-1}$ and 990 cm$^{-1}$ disappeared. Intrinsic viscosity ($\eta_{inh}$) of this polymer was 0.72.

By way of comparison, polymerization was carried out under the same conditions as described above except that 2.64 g (1.95 mol % based on the monomer) of initiator (II) was added in place of initiator (1). The obtained polymer had intrinsic viscosity ($\eta_{inh}$) of only 0.18.

COMPARATIVE EXAMPLE 1

To 100 parts of a 5% aqueous solution of acrylamide (AAm) was added initiator (1) of this invention in determined amounts, and the solution was reacted at 50° C. for 21 hours. The results were as shown below.

| Run No. | 5% AAm solution g | wt % | Amount added g | Yield % | $\eta_{inh}$ |
|---|---|---|---|---|---|
| | | Initiator (1) | | | |
| (i) | 100 | 0.083 | 0.0042 | 0.85 | 0.270 |
| (ii) | 100 | 0.125 | 0.0063 | 1.05 | 0.260 |
| (iii) | 100 | 0.250 | 0.0125 | 3.95 | 0.280 |
| | | Initiator KPS*[1] | | | |
| (iv) | 100 | 0.250 | 0.0125 | 60.8 | 1.250 |

*[1]: KPS (potassium persulfate) is known as a radical initiator for the polymerization of vinyl compounds such as AAm, etc.

COMPARATIVE EXAMPLE 2

1.0 g of acrylonitrile (AN) was mixed and dissolved in 14.0 g of a 70% aqueous solution of zinc chloride, and the mixture was added with initiator (1) of this invention in determined amounts and reacted at 50° C. for 3 hours. The results are shown below.

| Run No. | AN g | 70% ZnCl$_2$ solution g | wt % | g | Yield % | $\eta_{inh}$ |
|---|---|---|---|---|---|---|
| | | | Initiator (1) | | | |
| (v) | 1.0 | 14.0 | 0.11 | 0.0011 | 35.0 | 0.123 |
| (vi) | 1.0 | 14.0 | 0.22 | 0.0022 | 38.1 | 0.116 |
| (vii) | 1.0 | 14.0 | 0.33 | 0.0033 | 56.1 | 0.120 |
| | | | Initiator AIBN*[2] | | | |

-continued

| Run No. | AN g | 70% ZnCl₂ solution g | wt % | g | Yield % | η$_{inh}$ |
|---|---|---|---|---|---|---|
| (viii) | 1.0 | 14.0 | 0.33 | 0.033 | 68.3 | 1.340 |

*2: AIBN (azobisisobutylonitrile) is known as a radical initiator for the polymerization of vinyl compounds such as AN, etc.

As apparent from a comparison of the above-shown results of Examples 1–6 and the results of Comparative Examples 1 and 2, the azo type initiators (I) according to this invention prove to be highly effective only in the polymerization of monoallylamine and N-substituted monoallylamines and are inferior in their effect to the conventional polymerization initiators such as potassium persulfate and azobisisobutylonitrile in the polymerization of other types of polymerizable monomers such as acrylamide and acrylonitrile.

What is claimed is:

1. A process for preparing polymers of inorganic acid salts of monoallylamine or N-substituted monoallylamines, which comprises polymerizing inorganic acid salts of monoallylamine or N-substituted monoallylamines in a polar solvent in the presence of a radical initiator represented by the general formula:

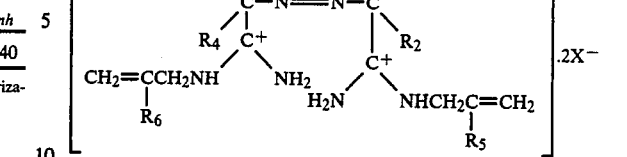

wherein $R_1$, $R_2$, $R_3$ and $R_4$ represent a same or different hydrocarbon groups, and $R_1$ and $R_2$, and/or $R_3$ and $R_4$ may form a ring; $R_5$ and $R_6$ represent independently hydrogen or an alkyl group having 1–4 carbon atoms; and X represents an anion.

2. A process according to claim 1, wherein said radical initiator is one selected from the group consisting of 2,2'-azobis(2-N-allylamidiniumpropane)dichloride, 2,2'-azobis(2-N-allylamidiniumbutane)dichloride, 2,2'-azobis(2-N-allylamidinium(4-methyl)pentane)dichloride, 1,1'-azobis(1-N-allylamidiniumcyclohexane)dichloride, and 2,2'-azobis(2-N-methallylamidiniumpropane) dichloride.

3. A process according to claim 1, wherein the amount of said radical initiator is 0.05–10% by weight based on the weight of the inorganic acid salt of monoallylamine or N-substituted monoallylamines.

* * * * *